US010228841B2

United States Patent
Dan et al.

(10) Patent No.: US 10,228,841 B2
(45) Date of Patent: Mar. 12, 2019

(54) INDICATORS FOR RELATIVE POSITIONS OF CONNECTED DEVICES

(71) Applicant: Cisco Technology, Inc., San Jose, CA (US)

(72) Inventors: Ronnie Dan, Modiin (IL); Robert Cressey, London (GB); Patricia Patitucci, Guildford (GB); Olivier Frebourg, Southampton (GB); Simon Dyke, Southampton (GB); Andrew Zamler-Carhart, Paris (FR)

(73) Assignee: Cisco Technology, Inc., San Jose, CA (US)

( * ) Notice: Subject to any disclaimer, the term of this patent is extended or adjusted under 35 U.S.C. 154(b) by 352 days.

(21) Appl. No.: 14/730,580

(22) Filed: Jun. 4, 2015

(65) Prior Publication Data
US 2016/0357385 A1 Dec. 8, 2016

(51) Int. Cl.
| | | |
|---|---|---|
| *G06F 3/0488* | (2013.01) | |
| *H04W 4/02* | (2018.01) | |
| *G06F 1/16* | (2006.01) | |

(52) U.S. Cl.
CPC .......... *G06F 3/0488* (2013.01); *G06F 1/1643* (2013.01); *G06F 1/1698* (2013.01); *H04W 4/02* (2013.01)

(58) Field of Classification Search
None
See application file for complete search history.

(56) References Cited

U.S. PATENT DOCUMENTS

| | | | | |
|---|---|---|---|---|
| 2009/0181699 A1* | 7/2009 | Tysowski | ................ | H04M 1/56 455/457 |
| 2010/0045704 A1* | 2/2010 | Kim | .................... | G01C 21/3626 345/660 |
| 2011/0083111 A1* | 4/2011 | Forutanpour | ......... | G06F 1/1694 715/863 |
| 2011/0283223 A1* | 11/2011 | Vaittinen | ............ | G01C 21/3647 715/781 |
| 2012/0131458 A1* | 5/2012 | Hayes | ............... | H04N 21/41407 715/716 |
| 2013/0173156 A1* | 7/2013 | Wither | ................ | G01C 21/3682 701/533 |
| 2013/0263013 A1* | 10/2013 | Jiang | .................... | G06F 3/04883 715/752 |
| 2013/0325341 A1* | 12/2013 | van Os | ............. | G01C 21/3611 701/533 |
| 2014/0040079 A1* | 2/2014 | Smirin | ................ | G06Q 30/0641 705/27.1 |
| 2014/0066104 A1* | 3/2014 | Alfaro | ...................... | G06T 11/60 455/456.3 |
| 2014/0180576 A1* | 6/2014 | LaMarca | ............ | G01C 21/3484 701/465 |
| 2014/0218392 A1* | 8/2014 | Moore | ............... | G01C 21/3667 345/619 |

(Continued)

*Primary Examiner* — Toan H Vu
(74) *Attorney, Agent, or Firm* — Polsinelli PC

(57) ABSTRACT

Various embodiments utilize a portable electronic device determining the relative physical location of a connected device and displaying a location indicator on a display of the portable electronic device. This location indicator can "point" to the connected device and provide an indication as to how far away the connected device is. The portable electronic device can facilitate user interaction with the connected device.

6 Claims, 8 Drawing Sheets

(56) References Cited

U.S. PATENT DOCUMENTS

| | | | | |
|---|---|---|---|---|
| 2014/0278072 A1* | 9/2014 | Fino | ............... | G01C 21/3697 |
| | | | | 701/465 |
| 2015/0015479 A1* | 1/2015 | Cho | ............... | G06F 3/013 |
| | | | | 345/156 |
| 2015/0111603 A1* | 4/2015 | Rivard | ............... | H04W 4/02 |
| | | | | 455/456.3 |
| 2015/0245168 A1* | 8/2015 | Martin | ............... | H04W 4/02 |
| | | | | 715/751 |
| 2015/0346921 A1* | 12/2015 | Erad | ............... | G06F 3/0482 |
| | | | | 715/738 |
| 2016/0142874 A1* | 5/2016 | Jung | ............... | H04W 4/023 |
| | | | | 455/456.1 |
| 2016/0360382 A1* | 12/2016 | Gross | ............... | G06F 3/0488 |

\* cited by examiner

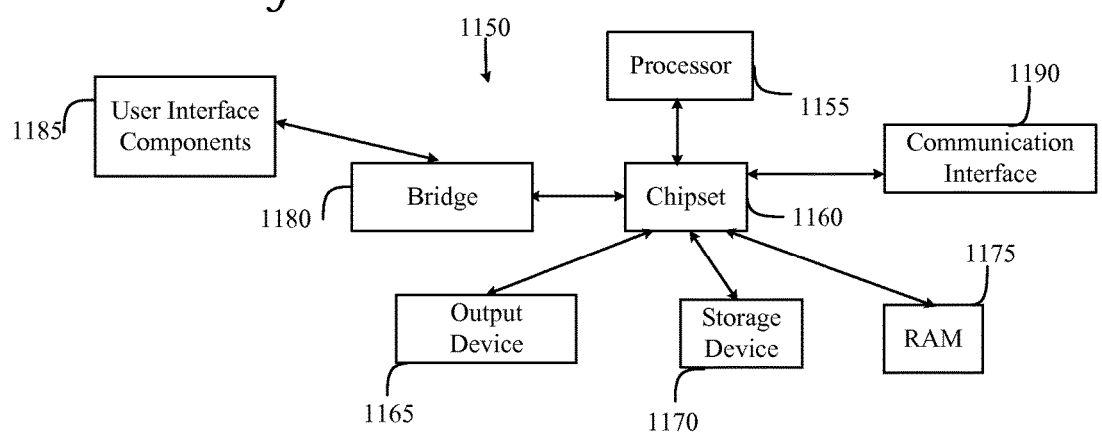
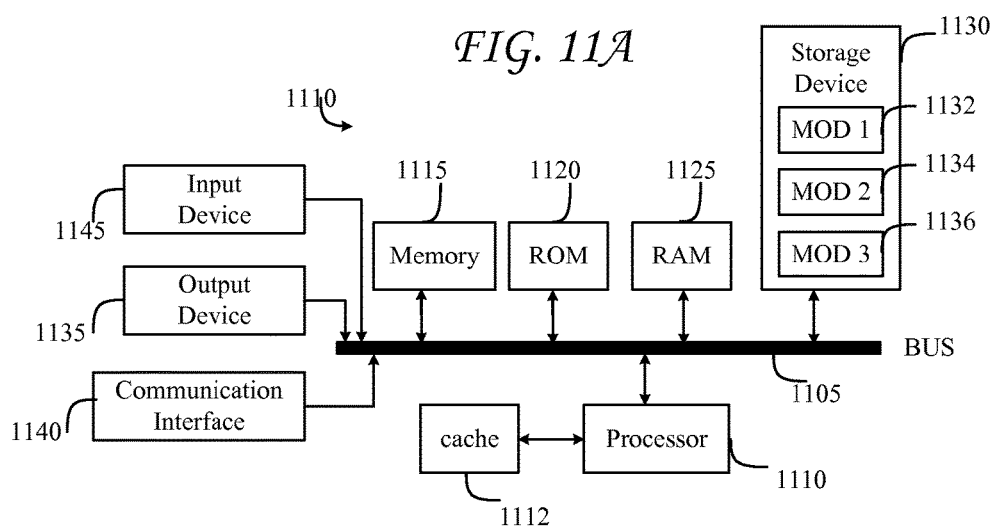

INDICATORS FOR RELATIVE POSITIONS OF CONNECTED DEVICES

TECHNICAL FIELD

The present disclosure generally relates to presenting a graphical user interface element to represent the relative position of a connected device.

BACKGROUND

In recent years, falling costs and technological advancements have spurred the growth of "connected," or "smart", devices. Many of these devices have traditionally functioned as "dumb" devices, but experience some added benefit by becoming connected. Conventional technology has certain deficiencies, especially concerning facilitating user interaction. For example, a user may have difficulty locating and interacting with a connected device.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 11A and 11B illustrate example system embodiments.

DESCRIPTION OF EXAMPLE EMBODIMENTS

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and computer-readable storage media for simplified, streamlined, and coherent interaction with a connected device. For example, a device can detect the relative location of a nearby connected electronic device and display a graphical user interface element indicating the direction of the relative location of the nearby connected electronic device. In some embodiments, the graphical user interface element is a portion of a ring on the perimeter of the device's display. The interface element can be interactive, enabling a user to do actions or view information related to the connected electronic device.

Description

Figure 1:
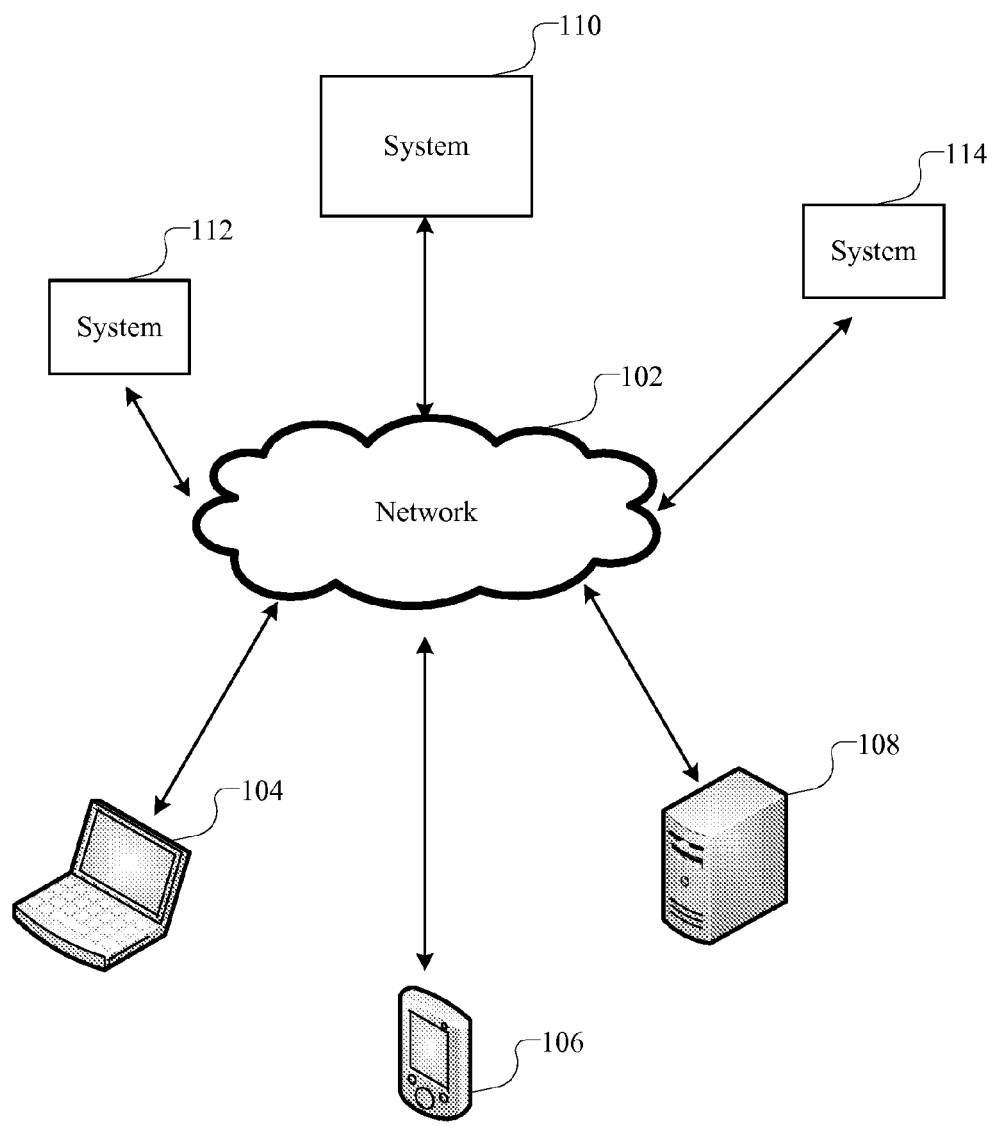
FIG. 1 illustrates an example configuration of devices and a network.

The disclosed technology addresses the need in the art for presenting a graphical user interface element to represent the relative position of a connected device. Disclosed are systems, methods, and computer-readable storage media for presenting a graphical user interface element to represent the relative position of a connected device. A description of interconnected devices, as illustrated in FIG. 1, is first disclosed herein. A discussion of example embodiments, as illustrated in FIGS. 2-9, will then follow. The discussion then concludes with a brief description of example devices, as illustrated in FIGS. 10A and 10B. These variations shall be described herein as the various embodiments are set forth. The disclosure now turns to FIG. 1.

FIG. 1 illustrates a schematic block diagram of example architecture 100 including nodes/devices interconnected by various methods of communication. Devices 104-114 can communicate with each other via network 102. Network 102 can include a public network, such as the Internet, and/or a private network, such as a local area network (LAN). Devices 104-108 can include any computing devices, such as a laptop, a smartphone, a server, a tablet computer, a smart television, and so forth. Moreover, systems 110-114 can include system or appliance with networking capabilities, such as an alarm system, a smartwatch, a GPS system, a computing component in a car, etc.

Figure 2A:
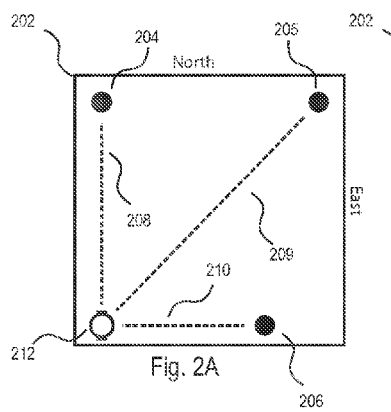
FIGS. 2A, 2B, and 2C illustrate example locations of objects relative to a portable electronic device.
Figure 2B:
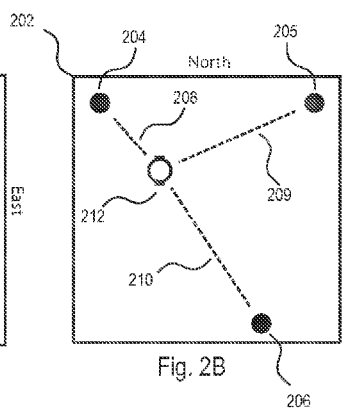
Figure 2C:
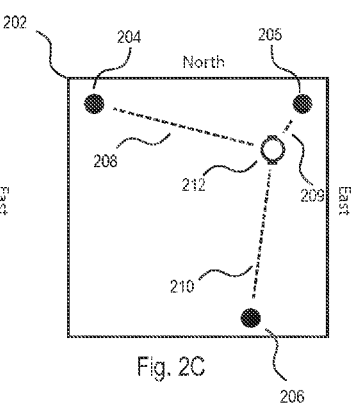
Figure 2D:
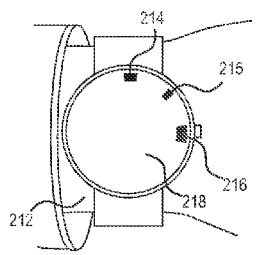
FIGS. 2D, 2E, and 2F illustrate example indicators on a portable electronic device as could be observed in the respective locations depicted in FIGS. 2A, 2B, and 2C.
Figure 2E:
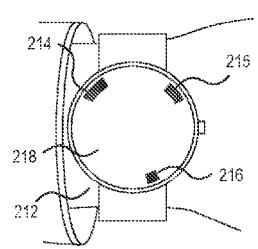
Figure 2F:
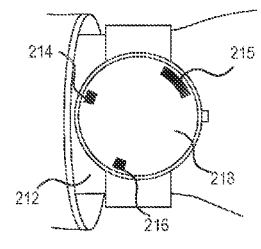

FIGS. 2D, 2E, and 2F illustrate example directional indicators 214/215/216 on portable electronic device 212 as could be observed while portable electronic device 212 is various locations in room 202 as depicted in FIGS. 2A, 2B, and 2C. In these non-limiting examples, portable electronic device 212 is represented as a wearable "smart watch" on a user's wrist.

For a clear description of these figures, the top of FIGS. 2A, 2B, and 2C can be considered "north," with the right being "east," bottom being "south," and left being "west" of the room 202. It should be understood that such designations are non-limiting labels used only for the purposes of describing the figures and should not imply that aspects of the present disclosure require any orientation relative to cardinal directions.

Similarly, for a clear description of these figures, the top of display 218 can be considered 0 degrees, with right being 90 degrees, bottom being 180 degrees, left being 270 degrees, and the intermediaries being the portion of a 360 degree circle. This should not imply that display 218 must be circular; various alternative embodiments of display 218 are disclosed herein.

At a given location, portable electronic device 212 is a certain distance and angle from each connected device, as represented by dashed lines 208, 209, and 210.

FIGS. 2D, 2E, and 2F illustrate an example display 218 on portable electronic device 212 corresponding to the respective locations in room 202 illustrated in FIGS. 2A, 2B, and 2C. Display 218 can contain graphical user interface elements, also called directional indicators, 214/215/216 as representations of the distances and angles of connected devices 204/205/206 relative to portable electronic device 212.

As used herein, "connected device" can refer to places or objects of interest. In some embodiments, connected device 204/205/206 maintains an active connection with portable electronic device 212. In alternative embodiments, connected device 204/205/206 is not actively connected to portable electronic device 212, but portable electronic device 212 is still aware of connected device. In some embodiments, connected device 204/205/206 is connected (i.e. registered) with a system that will communicate interaction data to and from portable electronic device 212.

As the angle between portable electronic device 212 and connected devices 204/205/206 changes, directional indicators 214/215/216 can indicate the different angles accordingly. For example, in FIG. 2A connected device 204 is directly north of portable electronic device 212, which is represented by directional indicator 214 being at 0 degrees; in a second location of portable electronic device 212 depicted in FIG. 2B, connected device 204 is now northwest of portable electronic device 212, which is represented by directional indicator 214 being at 315 degrees on display 218. In FIG. 2D, directional indicator 214 is at 0 degrees, directional indicator 215 is at 45 degrees, and directional indicator 216 is at 90 degrees; if portable electronic device 212 were to rotate clockwise 90 degrees, directional indicators 214/215/216 can then adjust accordingly (i.e., 270 degrees, 315 degrees, and 0 degrees, respectively). In other words, the directional indicators 214/215/216 can "point" to the respective connected devices 204/205/206.

In some embodiments, portable electronic device 212 can dynamically change orientation and/or position which can result in directional indicators 214/215/216 dynamically adjusting to correspond to the new orientation and/or position.

As portable electronic device 212 gets closer to or further from any connected device 204/205/206, the respective directional indicator 214/215/216 can indicate the change in distance. This indication can be a change in size as exemplified with directional indicator 215 growing in size as depicted in FIGS. 2D, 2E, and 2F. Specifically, directional indicator 214/215/216 can become a larger section of a ring (or annulus), as depicted. In some embodiments, the indication of change can take other forms while directional indicator 214/215/216 remains the same size. For example, directional indicator 214/215/216 can change color, show an approximate distance (e.g., "20 yards"), pulse at a rate inversely proportional to the relative distance, change shape, or otherwise indicate an approximate distance. In some embodiments, if the distance is greater than a predetermined amount, directional indicator 214/215/216 can be not shown at all. In some embodiments, display 218 can indicate if the distance is smaller than a predetermined amount (e.g., by having directional indicator 214/215/216 take up the entire display 218 or highlighting directional indicator 214/215/216 to show it is within a predetermined distance). In some embodiments, directional indicator 215/215/216 does not indicate distance.

Although many features herein described are done so in a two-dimensional environment, it should be understood that the many aspects of the present disclosure can be practiced within a three-dimensional (3D) environment. For example, display 218 can show directional indicators 214/215/216 in 3D space, have directional indicator 214/215/216 corresponding to connected device 204/205/206 indicate altitude (e.g., text saying "1st floor," 2nd floor," etc.), or display directional indicator 214/215/216 with varying transparency according to height/depth. In some of embodiments where 3D environments are represented, display 218 can represent directional indicators 214/215/216 as they are oriented relative to all axes of display 218 (i.e., any rotations in any direction of display 218 will result in changes in directional indicators 214/215/216), while in other embodiments display 218 only adjusts for rotations about the axis that extends perpendicular to display 218.

Although room 202 is depicted to assist in this description, any room, container, or other enclosed space can be utilized according to the concepts disclosed herein. Some embodiments do not utilize an enclosed space. For example, the concepts disclosed herein can be applied to a field, road, etc.

In some embodiments, directional indicators 214/215/216 can show the relative position/orientation of places or objects of interest irrespective of whether the places or objects of interest comprise a connected device 204/205/206. For example, portable electronic device 212 can use triangulation to determine its position/orientation and determine the relative position/orientation of connected device 204/205/206. Portable electronic device 212 can compare the strengths of signals coming from beacons with known locations to assist in triangulation. The signals can be Bluetooth, WiFi, etc. Portable electronic device 212 can determine its position/orientation by using a camera to detect the geometry of the environment and determine its position/orientation from the detected geometry. In some embodiments, the portable electronic device 212 combines readings from multiple sensors in an optimal manner to produce the best and most accurate position/orientation determination possible. Such "sensor fusion" can comprise data from a GPS, accelerometer, gyroscope, barometer, laser/infrared 3D scanner, camera, stereoscopic cameras, etc. Once the portable electronic device 212's position/orientation is determined, it can then determine the relative location of the places or objects of interest using their known locations and the calculated location/orientation of portable electronic device 212. As mentioned previously, "connected device" can refer to places or objects of interest, regardless of whether they are "connected" or contain any electronics. In some embodiments, a connected device 204/205/206 is physically coupled to an object to promote interactivity with the object.

Although three directional indicators 214/215/216 are depicted, any number of directional indicators 214/215/216 can be displayed (including one or zero). Because too many directional indicators 214/215/216 can become confusing for a user, multiple directional indicators 214/215/216 can be combined. For example, if the directional indicators represented stores in a shopping mall, there could be a directional indicator for "Food Court"; once portable electronic device 212 is near the food court, that directional indicator could give way to directional indicators representing individual restaurants. The food court can thus be considered a "parent directional indicator," while the individual restaurants can be considered "child directional indicators." A parent directional indicator can be a child directional indicator to another parent directional indicator, thus establishing a hierarchy of directional indicators (e.g., directional indicator indicating a city could turn into directional indicators representing shopping destinations, followed by individual stores, then sections of the store, etc.). If directional indicators 214/215/216 have a parent directional indicator, a portion of display 218 can represent the parent. This can inform the user that they are within the area of the parent (e.g., text in the center of display 218 showing "you are now in the food court" or display 218 taking on a color that represents the parent directional indicator).

In some embodiments, portable electronic device 212 can be a "smart watch" as depicted, but other embodiments are sufficiently capable of performing the functions disclosed herein. For example, the portable electronic device 212 can be a tablet, phone, e-reader, head mounted display, etc.

In some embodiments, display 218 can be various shapes. For example, display 218 can be circular, oval, square, rectangular, a rounded rectangle, etc. Display 218 can be three-dimensional utilizing techniques known in the art.

Figure 3A:
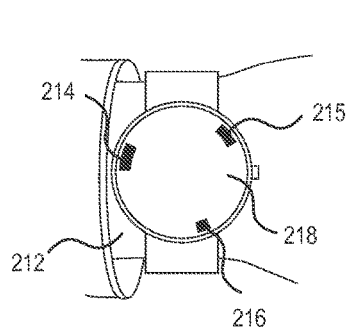
FIGS. 3A, 3B, and 3C illustrate an example indicator selection action.
Figure 3B:
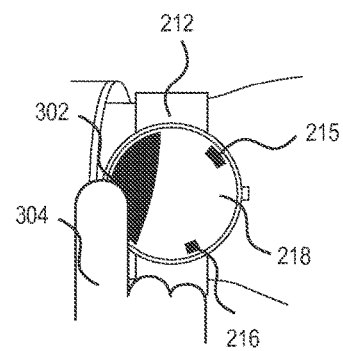
Figure 3C:
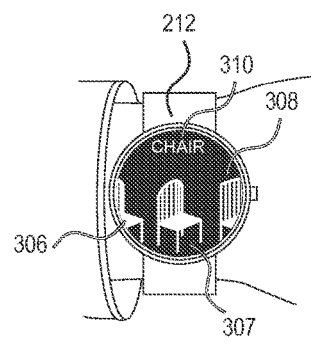

FIGS. 3A, 3B, and 3C depict an example embodiment where a user can make a selection of a directional indicator. FIG. 3A represents three directional indicators 214/215/216 on display 218 of portable electronic device 212; FIG. 3B represents user's Finger 304 pressing the region that contained directional indicator 214, which has transformed into indication of selection 302; and FIG. 3C represents the result of a selection, showing selection text 310 ("Chair"), and current option 307 surround by alternate options 306/308 on either side.

In some embodiments, a directional indicator is selected via a touch input from finger 304 (as depicted in FIG. 3B). In alternative embodiments, the directional indicator can be selected by other means. For example, voice commands, gestures, pointing the portable electronic device 212 so that directional indicator is at 0 degrees, being within a predetermined distance from connected device, etc. Indication of selection 302 can be a growing region coming from the location of directional indicator, a change in color, etc.

Display 218 can represent data corresponding to the selected connected device. In some embodiments, data related to the selection is shown predominately on display 218. In some embodiments, an array of options is available relating to connected device. For example, in FIG. 3C connected device 204/205/206 is a chair and the options are a chair with an arched back (307), a chair with a flat-top back (308), and another chair design (306). A user can move the options left or right to highlight different options. Other example options a user can cycle through are color, pattern, design, menu items (at a restaurant), size (of clothing etc.), delivery options, quantity, etc. Multiple options or arrays of options may be presented on the screen at a time.

Figure 4:
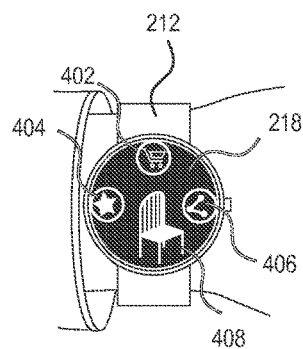
FIG. 4 illustrates an example embodiment with actions related to an object.

FIG. 4 depicts an example presentation on display 218 of portable electronic device 212. A selected connected device 408, corresponding to a previously selected directional indicator, can be presented in the center with various selectable icons 402/404/406 also presented. For example, there can be icons for various actions such as purchase the connected device (402), "favorite" the connected device (404), share data related to the connected device (406), ask for help (not depicted), tag the corresponding directional indicator (not depicted), etc.

Figure 5:
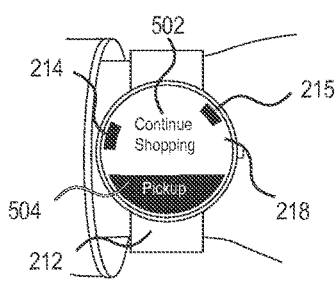
FIG. 5 illustrates an example embodiment.

FIG. 5 depicts an example presentation on display 218 of portable electronic device 212. In FIG. 5, a user has selected an item and display 218 presents additional selectable regions: "Continue Shopping" 502 and "Pickup" 504. If the user selects "Continue Shopping" 502, display 218 can then display directional indicators 215/215/216 in a manner depicted in FIG. 3A. If the user selects Pickup 504, display 218 can then display a directional indicator 214 corresponding to a location where the user can pick up the purchased goods.

FIG. 5 also depicts how directional indicators can show on portions of display 218 while display elements (such as "Pickup" 504) can obscure other directional indicators (such as directional indicator 216). In some embodiments, directional indicators can be presented simultaneously with selectable options and display elements. In some embodiments, directional indicators are not displayed when selectable options or display elements are presented. In some embodiments, directional indicators are partially displayed while selectable options or display elements are presented.

Figures 6A, 6B:
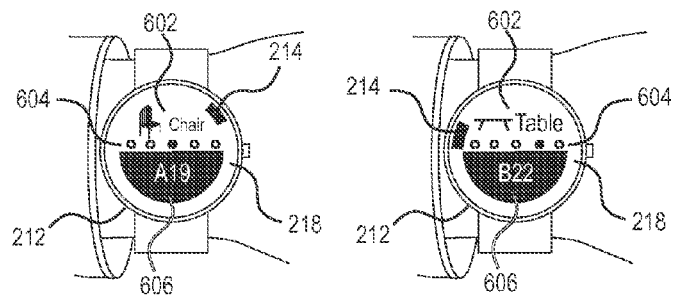
FIGS. 6A and 6B illustrate an example embodiment for locating items in a store.

FIGS. 6A and 6B depict example embodiments which guide a user to find various items in a store. Current item 602 can have a graphic and/or text depicting the connected device that is active. Directional indicator 214 can indicate the relative direction and distance to the connected device. Additional information 606 can be represented on the screen; in some embodiments, additional information 606 can indicate which aisle and section (A19/B22) of the store the connected device is located in. Sequence indicator 604 can depict an array of items, the current item 602 being one of them. For example, in FIGS. 6A and 6B there are five items in sequence indicator 604; the chair in FIG. 6A is the third item, while the table in FIG. 6B is the fourth item. If the store is a grocery store and the sequence indicator 604 corresponds to a grocery list, additional information 606 can display the quantity desired of the current item 602 (e.g., three onions and 2 eggs). Current item 602 can automatically switch the next item in the array when portable electronic device 212 detects that the current item 602 no longer should be shown. In some embodiments, portable electronic device 212 makes such determination by detecting that the portable electronic device 212 is within range of the current item 602.

Figures 7A, 7B, 7C:
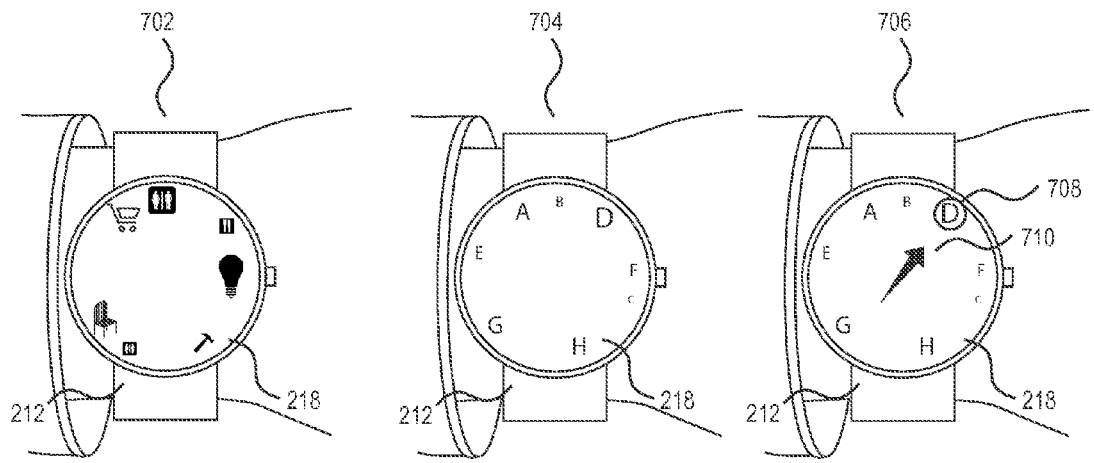
FIGS. 7A, 7B, and 7C illustrate various example directional indicators.

FIGS. 7A, 7B, and 7C depict how display 218 of portable electronic device 212 can show alternate directional indicator shapes. In FIG. 7A the directional indicators are various icons representing various items and locations. In FIG. 7B, the directional indicators are letters. In FIG. 7C the directional indicators are letters with Letter "D" 708 emphasized with a circle and arrow 710 pointing to Letter "D" 708. In some embodiments, arrow 710 can serve the purpose of the directional indicator, providing distance information (based on the size of arrow 710) and orientation information. FIGS. 7A, 7B, and 7C exemplify how directional indicators of various designs can indicate relative distance by having a variable size.

Figure 8:
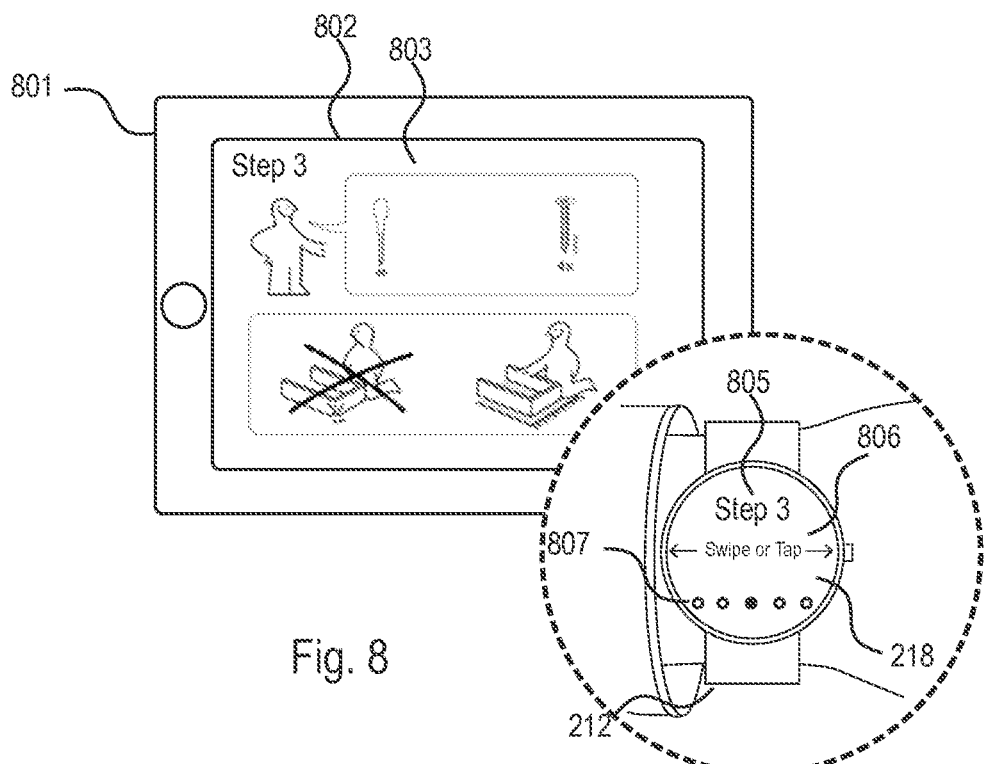
FIG. 8 illustrates connecting a portable electronic device to a second electronic device for additional interactivity.

FIG. 8 depicts second electronic device 801 showing additional information 803 related to current item 805 on portable electronic device 212. In this example, portable electronic device 212 can cycle through steps of how to build furniture and can present those steps on display 802 of second electronic device 801. Current item 805 ("Step 3") can be the current step in a series of steps represented by sequence indicator 807 (there are five steps depicted, with the third one being active). To change current item 805, a user can make a gesture such as a swipe or a tap 806. Other example gestures are shaking portable electronic device 212, a voice command, etc.

Second electronic device 801 can be many different types of devices. For example, second electronic device 801 can be a tablet computer, a laptop, a television screen, etc. The portable electronic device 212 can send data wirelessly to the second electronic device 801 for display 218.

Second electronic device 801 can expand the interface of portable electronic device 212 in many ways. For example, if portable electronic device 212 displays an item on display 218, second electronic device 801 can show additional information related to the item. In some embodiments, second electronic device 801 can detect inputs from the user and relay those inputs to the portable electronic device 212. In some embodiments, portable electronic device 212 determines that it is within range of second electronic device 801 and automatically utilizes the enhanced functionality of second electronic device 801 (e.g., showing information on the display of second electronic device 801).

Figure 9:
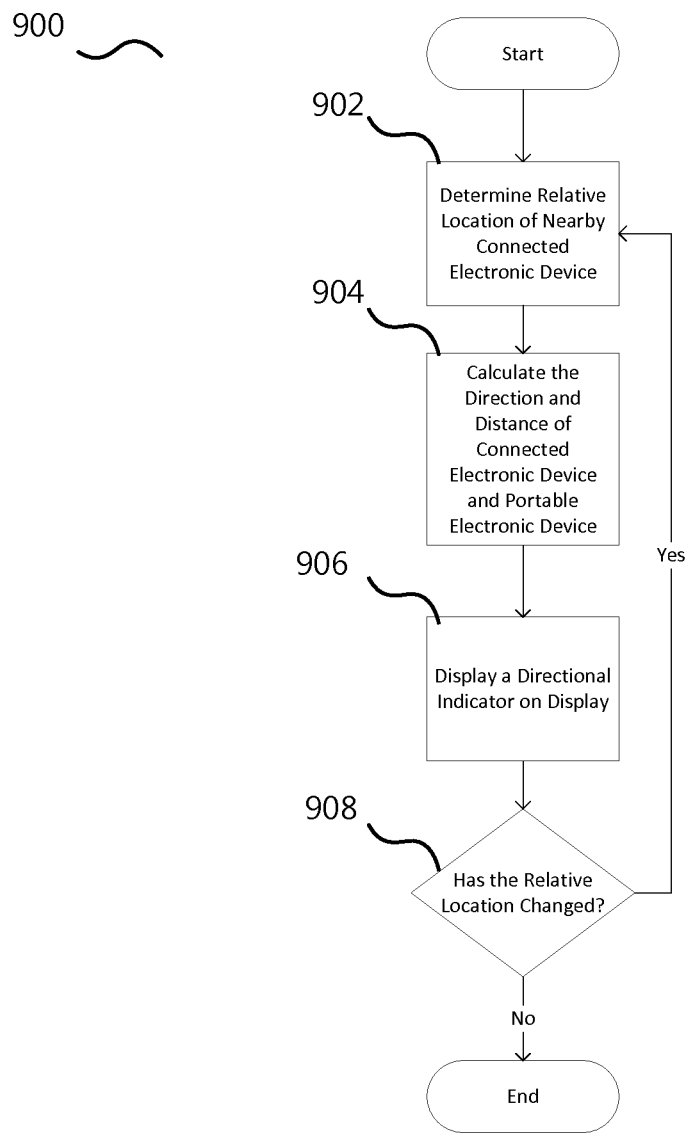
FIG. 9 illustrates an example method according to various embodiments
Figure 10A:
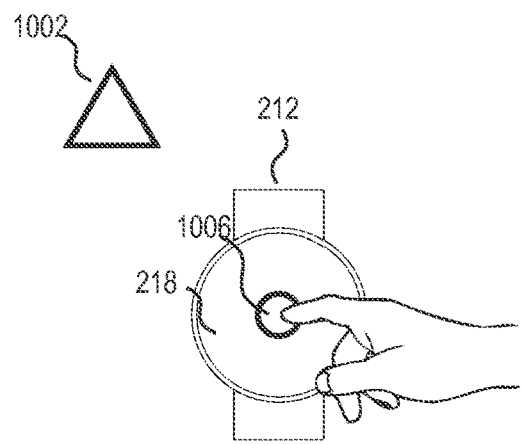
FIGS. 10A and 10B illustrate an example technique for identifying a new object.
Figure 10B:
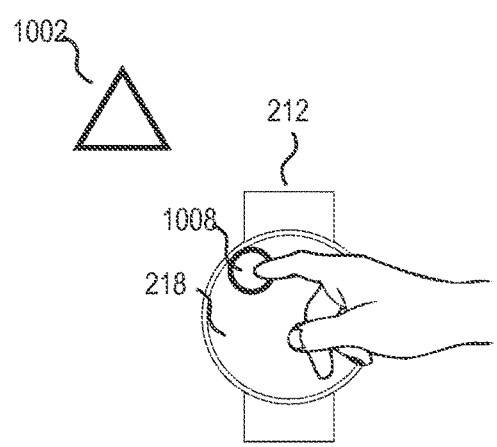

Having disclosed some basic system components and concepts, the disclosure now turns to the exemplary method embodiment shown in FIG. 9. The steps outlined herein are examples and can be implemented in any combination thereof, including combinations that exclude, add, rearrange, or modify certain steps. The method in FIG. 9 can be practiced by portable electronic device 212 or another device assisting portable electronic device 212.

FIG. 9 illustrates example method 900 for displaying directional indicator 215/215/216 on display 218. The portable electronic device 212 can determine the relative location of nearby connected device (902). In some embodiments, portable electronic device 212 first determines its location by using triangulation (i.e., comparing the signal strength of various beacons that have known locations) while determining its orientation with a compass (or similar orientation technique).

Portable electronic device 212 can then compare its calculated location with the known location of connected device 204/205/206 to determine the relative distance and angle (904). In some embodiments, portable electronic device 212 can directly detect the relative angle and distance to connected device 204/205/206 based on a signal emitted from connected device 204/205/206.

Portable electronic device 212 can then display on display 218 directional indicator 214/215/216 corresponding to the distance and angle of connected device 204/205/206 (906).

Portable electronic device 212 can then determine if the relative location has changed (908). If it has, portable electronic device 212 can return to step (902). Portable electronic device 212 can use an accelerometer, gyroscope, compass, barometer, GPS receiver, wireless network adapter, etc. to determine if the relative location has likely changed.

FIGS. 10A and 10B illustrate an example technique for identifying a new connected device 1002. In some embodiments, portable electronic device 212 is initially unaware of the location of connected device 1002. If connected device 1002 changed its absolute position or is previously unknown to portable electronic device 212 it is important to determine its new position. Portable electronic device 212 can determine the relative distance of connected device 1002. The relative distance can be determined by analyzing the strength of a wireless signal coming from connected device 1002. If relative distance is determined, it can be necessary to determine the relative direction of connected device 1002 in order to calculate its position. Portable electronic device 212 can detect user input effective to signal the direction of connected device 1002.

In some embodiments, the user places their finger in first location 1006 on screen 218 and moves it to second location 1008 thus "pointing" to the object and identifying its location. In some embodiments, the user rotates portable electronic device 212 so that the object is at 0 degrees. In some embodiments, user moves portable electronic device 212 moved while connected device 1002 remains stationary; as portable electronic device 212 detects its own motion and the varying distance of connected device 1002, it can calculate the position of connected device 1002. In some embodiments, the user repeats this process of pointing to connected device 1002 from various locations around connected device 1002.

In some embodiments, a user can use this technique of identifying connected device 1002 to mark objects. Example objects that can be marked include pot holes, vacant lots, malfunctioning parking meters, malfunctioning street lights, signs needing repair, trees needing a trim, abandoned vehicles, graffiti, playgrounds, public restrooms, overflowing garbage cans, bike racks, transit shelters, benches, blocked sidewalks, blocked parking spaces, etc. A user can also mark or identify conditions or circumstances, for example fraud at a store, hate crimes, extreme weather, fire safety situations, ice/snow, liquor license violations, sewer cleanup, stray animals, construction hazards, low water pressure, electricity problems, senior citizen well-being check, lost pets, aircraft noise, etc.

A user can identify objects, conditions, and circumstances and upload them to a centralized server. This can assist city officials address the problems and needs more efficiently. In some embodiments, a user can leave a connected device at the location of the object, condition, or circumstance.

Example Devices

FIG. 11A and FIG. 11B illustrate example system embodiments. The more appropriate embodiment will be apparent to those of ordinary skill in the art when practicing the present technology. Persons of ordinary skill in the art will also readily appreciate that other system embodiments are possible.

FIG. 11A illustrates a conventional system bus computing system architecture 1100 wherein the components of the system are in electrical communication with each other using a bus 1105. Exemplary system 1100 includes a processing unit (CPU or processor) 1110 and a system bus 1105 that couples various system components including the system memory 1115, such as read only memory (ROM) 1170 and random access memory (RAM) 1175, to the processor 1110. The system 1100 can include a cache of high-speed memory connected directly with, in close proximity to, or integrated as part of the processor 1110. The system 1100 can copy data from the memory 1115 and/or the storage device 1130 to the cache 1117 for quick access by the processor 1110. In this way, the cache can provide a performance boost that avoids processor 1110 delays while waiting for data. These and other modules can control or be configured to control the processor 1110 to perform various actions. Other system memory 1115 may be available for use as well. The memory 1115 can include multiple different types of memory with different performance characteristics. The processor 1110 can include any general purpose processor and a hardware module or software module, such as module 1 1137, module 7 1134, and module 3 1136 stored in storage device 1130, configured to control the processor 910 as well as a special-purpose processor where software instructions are incorporated into the actual processor design. The processor 1110 may essentially be a completely self-contained computing system, containing multiple cores or processors, a bus, memory controller, cache, etc. A multi-core processor may be symmetric or asymmetric.

To enable user interaction with the computing device 1100, an input device 1145 can represent any number of input mechanisms, such as a microphone for speech, a touch-sensitive screen for gesture or graphical input, keyboard, mouse, motion input, speech and so forth. An output device 1135 can also be one or more of a number of output mechanisms known to those of skill in the art. In some instances, multimodal systems can enable a user to provide multiple types of input to communicate with the computing device 1100. The communications interface 1140 can generally govern and manage the user input and system output. There is no restriction on operating on any particular hardware arrangement and therefore the basic features here may easily be substituted for improved hardware or firmware arrangements as they are developed.

Storage device 1130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1175, read only memory (ROM) 1170, and hybrids thereof.

The storage device 1130 can include software modules 1137, 1134, 1136 for controlling the processor 1110. Other hardware or software modules are contemplated. The storage device 1130 can be connected to the system bus 1105. In one aspect, a hardware module that performs a particular function can include the software component stored in a computer-readable medium in connection with the necessary hardware components, such as the processor 1110, bus 1105, display 1135, and so forth, to carry out the function.

FIG. 11B illustrates an example computer system 1150 having a chipset architecture that can be used in executing the described method and generating and displaying a graphical user interface (GUI). Computer system 1150 is an example of computer hardware, software, and firmware that can be used to implement the disclosed technology. System 1150 can include a processor 1155, representative of any number of physically and/or logically distinct resources capable of executing software, firmware, and hardware configured to perform identified computations. Processor 1155 can communicate with a chipset 1160 that can control input to and output from processor 1155. In this example, chipset 1160 outputs information to output 1165, such as a display, and can read and write information to storage device 1170, which can include magnetic media, and solid state media, for example. Chipset 1160 can also read data from and write data to RAM 1175. A bridge 1180 for interfacing with a variety of user interface components 1185 can be provided for interfacing with chipset 1160. Such user interface components 1185 can include a keyboard, a microphone, touch detection and processing circuitry, a pointing device, such as a mouse, and so on. In general, inputs to system 1150 can come from any of a variety of sources, machine generated and/or human generated.

Chipset 1160 can also interface with one or more communication interfaces 1190 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1155 analyzing data stored in storage 1170 or 1175. Further, the machine can receive inputs from a user via user interface components 1185 and execute appropriate functions, such as browsing functions by interpreting these inputs using processor 1155.

It can be appreciated that example systems 1100 and 1150 can have more than one processor 1110 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

The invention claimed is:

1. A computer-implemented method for displaying content on a display, the display comprising an inner portion surrounded by an annulus, the method comprising:
    determining a relative location of a nearby connected electronic device from a current position of a portable electronic device;
    first displaying a first graphical user interface element in a position in the annulus, the position of the first graphical user interface element in the annulus defining a relative bearing between the portable electronic device and the relative location of the nearby connected electronic device;
    changing a physical characteristic of the first graphical user interface element in response to a change in distance between the portable electronic device and the relative location of the nearby connected electronic device, the changing comprising changing a size, shape and/or color of the first graphical user interface as it appears in the annulus; and
    displaying, in response to receiving a user input, a second graphical user interface element within the inner portion of the display for interacting with the nearby connected electronic device while simultaneously displaying in the position in the annulus either the first graphical user interface or another visual marker;
    wherein the user input comprises a swipe across the first graphical user interface element.

2. The computer-implemented method of claim 1, further comprising viewing more information about the connected electronic device, share information about the connected electronic device to an email address, or save information about the connected electronic device for later viewing.

3. A system for displaying content on a display, the display comprising an inner portion surrounded by an outer periphery, the system comprising:
    a wireless interface;
    memory;
    a display having an inner portion surrounded by an annulus;
    a processor connected to the wireless interface, memory, and display, wherein the processor is configured to:
        determine a relative location of a nearby connected electronic device from the current position of the system;
        first display a first graphical user interface element in a position in the annulus of the display, the position of the first graphical user interface element indicating in the annulus defining a relative bearing between the system and the relative location of the nearby connected electronic device; and
        change a physical characteristic of the first graphical user interface element in response to a change in distance between the portable electronic device and the relative location of the nearby connected electronic device, the changing comprising changing a size, shape and/or color of the first graphical user interface as it appears in the annulus; and
        display, in response to receiving a user input, a second graphical user interface element within the inner portion of the display for interacting with the nearby connected electronic device while simultaneously displaying in the position in the annulus either the first graphical user interface or another visual marker;
        wherein the user input comprises a swipe across the first graphical user interface element.

4. The system of claim 3, wherein the graphical user interface is configured to permit viewing more information about the connected electronic device, share information about the connected electronic device to an email address, or save information about the connected electronic device for later viewing.

5. A non-transitory computer-readable medium including computer executable instructions stored thereon, the instructions being effective cause a computer to display content on a display, the display comprising an inner portion surrounded by an annulus, the instructions being programmed to cause the computer to perform operations comprising:
    determine a relative location of a nearby connected electronic device from the current position of computer;
    first display a first graphical user interface element in a position in the annulus, the position of the first graphical user interface element indicating in the annulus defining a relative bearing between the computer and the relative location of the nearby connected electronic device; and
    change a physical characteristic of the first graphical user interface in response to a change in distance between the portable electronic device and the relative location of the nearby connected electronic device, the changing comprising changing a size, shape and/or color of the first graphical user interface as it appears in the annulus; and
    display, in response to receiving a user input, a second graphical user interface element within the inner portion of the display for interacting with the nearby connected electronic device while simultaneously displaying in the position in the annulus either the first graphical user interface or another visual marker;
    wherein the user input comprises a swipe across the first graphical user interface element.

6. The medium of claim 5, wherein the operations includes configuring the graphical user interface to permit viewing more information about the connected electronic device, share information about the connected electronic device to an email address, or save information about the connected electronic device for later viewing.

* * * * *